(12) United States Patent
Yim et al.

(10) Patent No.: US 8,553,660 B2
(45) Date of Patent: Oct. 8, 2013

(54) COOPERATIVE RELAY COMMUNICATION IN WIRELESS OFDMA STAR NETWORKS

(75) Inventors: Raymond Yim, Cambridge, MA (US); Hang Su, College Station, TX (US); Zafer Sahinoglu, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 950 days.

(21) Appl. No.: 12/651,472

(22) Filed: Jan. 3, 2010

(65) Prior Publication Data

US 2011/0164555 A1 Jul. 7, 2011

(51) Int. Cl.
*H04W 4/00* (2009.01)
*H04K 1/10* (2006.01)

(52) U.S. Cl.
USPC .................. 370/338; 375/260; 455/422.1

(58) Field of Classification Search
USPC ............... 370/335–338, 329–330, 340–348; 375/260; 455/422.1, 434
See application file for complete search history.

(56) References Cited

U.S. PATENT DOCUMENTS

| | | | |
|---|---|---|---|
| 8,145,264 B1* | 3/2012 | Hirsch et al. | 455/553.1 |
| 8,254,355 B2* | 8/2012 | Park | 370/338 |
| 2005/0020299 A1* | 1/2005 | Malone et al. | 455/552.1 |
| 2008/0080406 A1 | 4/2008 | Peplinski et al. | |
| 2008/0288845 A1* | 11/2008 | Tsfati et al. | 714/748 |
| 2010/0215009 A1* | 8/2010 | Yu et al. | 370/329 |
| 2010/0246375 A1* | 9/2010 | Orlik et al. | 370/203 |
| 2010/0316010 A1* | 12/2010 | Goldhamer | 370/329 |
| 2011/0255577 A1* | 10/2011 | Agee et al. | 375/219 |
| 2013/0059576 A1* | 3/2013 | Park et al. | 455/422.1 |

FOREIGN PATENT DOCUMENTS

WO 2004/111744 A2 12/2004

OTHER PUBLICATIONS

Palanisamy, P. and Nirmala, S.; "Downlink interference management in femtocell networks—a comprehensive study and survey"; IEEE Information Communication and Embedded Systems (ICICES), 2013 International Conference on; Publication Year: 2013, pp. 747-754.*
Woon Yong Jo, et al. "Reduction of Latency in Mobile Multi-Hop Relay (MMR) Networks," Wireless Communications & Signal Processing, 2009. WCSP 2009. International Conference On, IEEE, Piscataway, NJ USA, Nov. 13, 2009, pp. 1-5.
Peters S W et al : "The Future of WiMax: Multihop Relaying with IEEE 802.16j" IEEE Communications Magazine, IEEE Service Center, Piscataway, US, vol. 44, No. 1 Jan. 1, 2009, pp. 104-111, XP011249998.

* cited by examiner

*Primary Examiner* — Thai Hoang
(74) *Attorney, Agent, or Firm* — Dirk Brinkman; Gene Vinokur

(57) ABSTRACT

A wireless star network includes including a master node (master) and a set of N slave nodes (slaves), wherein the network uses orthogonal frequency division multiple access (OFDMA). The master partitions the set of slaves in a first subset A(i) and second subset B(j), wherein the first and second subsets are disjoint. Packets are transmitted by the first subset of slaves only while the master and second subset of slaves operate in receive mode, and
packets are transmitted by the second subset of slaves only while the master and first of slaves operate in receive mode.

9 Claims, 5 Drawing Sheets

100

200

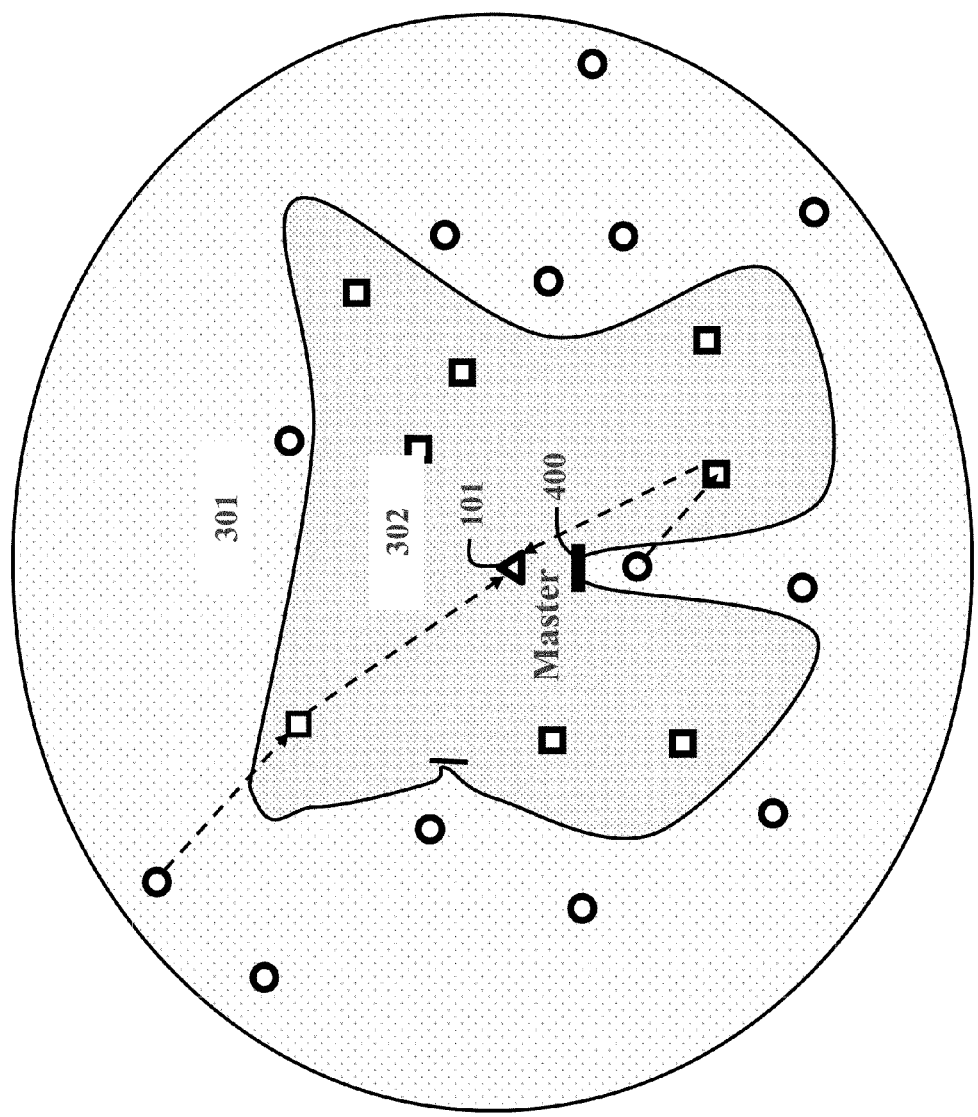

COOPERATIVE RELAY COMMUNICATION IN WIRELESS OFDMA STAR NETWORKS

FIELD OF THE INVENTION

This invention relates generally to wireless communication in star networks, and in particular to cooperative communication between master nodes and slave nodes in OFDMA star networks.

BACKGROUND OF THE INVENTION

A wireless star network includes a master node (master) and a set of slave nodes (slaves). The slaves transmit packets sequentially to the master using time division multiplexing, or simultaneously when frequency division multiplexing is used. If transmissions fail, then packets are retransmitted. It is desired to improve the performance of star networks.

One improvement uses temporal, spatial or frequency diversity, which results in different reception conditions. Orthogonal frequency division multiple access (OFDMA) provides reliable multipath channels, and high data rates using frequency and temporal diversity, see IEEE 802.16m (WiMAX), IEEE 802.22 and 3GPP LTE standards.

In OFDMA star networks, priority of traffic classes and urgency level of each packet can be used as criteria for frequency (channel) selection to achieve low latency for high priority traffic, without exploiting path diversity. Optimum subcarrier allocation in OFDMA networks over frequency selective slow fading channels has been described.

Path diversity in OFDMA networks uses multiple nodes as a collection of distributed antennas to improve reliability at the physical layer by obtaining a higher signal-to-noise (SNR) ratio. A distributed opportunistic access scheme for OFDMA with a back-off mechanism uses channel state information to avoid collisions. Spatial diversity can also be provided at the link layer.

Using half-duplex cooperation for OFDMA, pairs of cooperative nodes can transmit data sequentially within each OFDMA superframe by "piggy-backing" previously received packets to achieve path diversity. However, the pair of cooperating nodes must switch between transmit and receive states multiple times within a single OFDMA frame. In addition, unconditional relaying decreases efficiency when reliable channels are available.

SUMMARY OF THE INVENTION

The embodiments of the invention proved a method for improving the performance of an orthogonal frequency division multiple access (OFDMA) star network including a master node (master) and a set of slave nodes (slaves). The set of slaves are partitioned into two disjoint subsets. The nodes in a first subset transmit while the master and the slaves in the second subset receive. Then, the slaves in the second subset transmit while the master and the slaves in the first subset receive. This way the slaves in each subset can act as relay nodes (relays) for the slaves in the other subset when the packets transmitted by the slaves in the other subset are not received by the master.

The embodiments provide two partitioning modes. Hierarchical relay transmission (HRT) mode uses explicit signaling to indicates an ability to relay. Stochastic relay transmission (SRT) mode does not use explicit signaling but requires extra overhead time to switch between transmitting and receiving.

BRIEF DESCRIPTION OF THE DRAWINGS

FIGS. 3-5 are schematics of partitioning a set of slave nodes into subsets for sequential transmission according to embodiments of the invention;

DETAILED DESCRIPTION OF THE PREFERRED EMBODIMENTS

Figure 1:
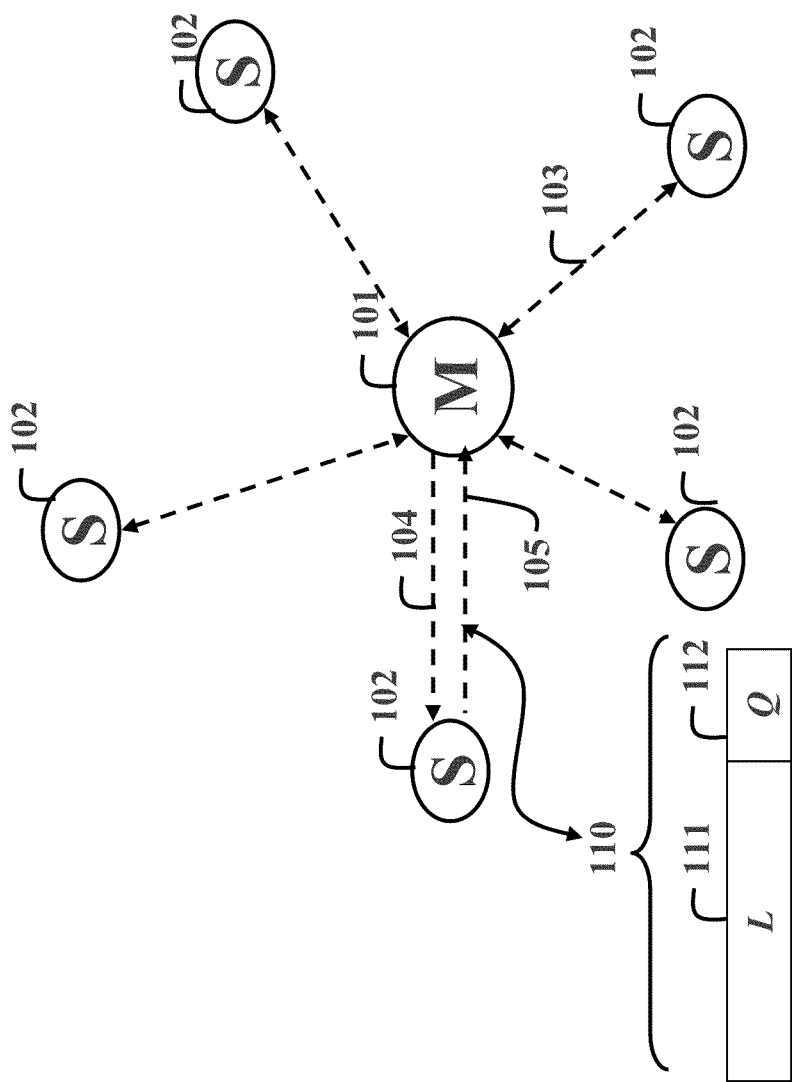
FIG. 1 is a schematic of an OFDMA star network used by embodiments of the invention.

FIG. 1 shows an orthogonal frequency division multiple access (OFDMA) OFDMA star network 100 that uses embodiments of our invention. The network includes a master (M) node (master) 101, and a set of N slave (S) nodes (slaves) 102. The slaves communicate with the master on wireless channels 103. Each channel includes a downlink (DL) 104 from the master to the slave, and an uplink (UL) 105 from the slave to the master. The network uses frequency and time division multiplexing to avoid interference.

Frequency resources r are partitioned into M=aN blocks, where a is a constant. Packet transmissions are independent of each other over time. The uplink channels from different slaves to the master are also independent. The transmission of each resource block can use the same transmit power, modulation and channel coding.

Each uplink packet 110 includes L bits of data 111, and Q bits of optional protocol specific overhead 112. The bit rate is R bits per second. If a channel path loss exponent is $\alpha$, then the packet success rate for a transmission of L+Q bits using a single resource block is $\exp(-cd^\alpha)$, where c is a constant, and d is the distance between the slave and master. The transmission time is (L+Q)/R. Alternatively, if resource block multiplexing is used, a transmission can use two resource blocks to transmit L+Q bits in $T_{tx}(Q)=(L+Q)/2R$ seconds, with the same packet success rate.

For the same pair of source and destination nodes, the channel allows a maximum of $D_0$ independent resource blocks. This is the maximum diversity order. Hence, when a slave transmits L+Q bits using r≥2 resource blocks in $2T_{tx}(Q)$ seconds, the increased diversity order improves the probability of success to $$P_s(d,r)=1-(1-\exp(-cd^\alpha))^{\min(r,D_0)} \tag{1}$$

where the function exp is an exponential, and the function min returns a minimum value. We assume the same probability of success for transmitting L bits using 2r≥4 resource blocks in $T_{tx}(Q)$ seconds.

Instead of increasing the diversity order, it is possible to transmit using a better channel code, and multiplexing resource blocks to transmit at an increased data rate.

The distance between slave node i and the master is $d_i$, and the distance between a pair of slaves i and j is $d_{ij}$. The probability of success for transmitting a packet from slave node i to the master using a single resource block is $P_s(d_i, 1)$, and the probability of success for slave j to receive the same packet is $P_s(d_{ij}, 1)$. The master uses these probabilities to assign the slaves to subsets, and schedule uplink transmissions accordingly as described below.

Figure 2:
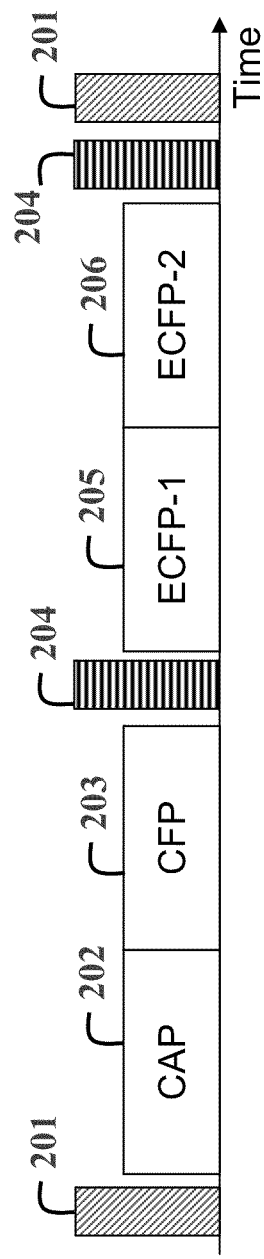
FIG. 2 is a block diagram of a superframe used by embodiments of the invention.

FIG. 2 shows a superframe 200 used by embodiments of our invention. Each superframe begins with a beacon 201 for resource allocation and synchronization. The beacon is followed by a contention access period (CAP) 203, a contention free period (CFP) 203, a group acknowledgement (GACK) 204, and first extended CFP (ECFP) 205 and a second ECFP 206. The ECFPs can also be followed by a GACK. Thus, there are three transmit opportunities (TxOP) to improve the success rate.

The first transmission is approximately $2T_{rx}(Q)$ seconds, and the second and third transmissions are $T_{rx}(0)$ seconds. The time required to switch between transmit and receive mode is $T_{ta}$ seconds. The GACK takes $T_{fb}$ seconds.

Transmission Schemes

Repeated Direct Transmission Mode

In a conventional repeated direct transmission (RDT) mode, during the first TxOP, each slave transmits using frequency diversity order a=M/N, and overhead Q=0. The probability of success for slave i is $P_s(d_i, a)$. The transmission time is $$T_1^{RDT} = 2T_{rx}(0) + T_{fb} + 2T_{ta}.$$

If the master fails to receive packets from the slaves, the master requests retransmission in the GACK 204. To meet the time budget of $T_{rx}(0)$ seconds during the subsequent ECFPs, at most M/2 slaves retransmit.

The number of failed packets is K. If K<M/2, then only M/2 slaves retransmit using two resource blocks each, with diversity order one. If K<M/2, then each slave has at least two resource blocks to transmit at diversity order one. Subsequently, two resource blocks are allocated at a time to increase the diversity order for the slaves that have the smallest probability of success.

RDT Initialization

The slave with a failed transmission is identified in a set E. The remaining number of resource blocks is r=M−2K. The probability of success for slave i is $$P_i = \begin{cases} 1, & \text{if } i \notin E, \\ P_s(d_i, 1), & \text{otherwise,} \end{cases} \qquad (2)$$

and the diversity order for slave i is $D_i = I_{\{i \in E\}}$, where $I\{\cdot\}$ is an indicator function.

Step (1) Determine the slave with the smallest probability of success according to $i = \arg\min_{i:D_i < D_0} P_i$.

If $D_i < D_0$, then determine the slave with the smallest diversity order according to $i = \arg\min_{i \in E}$.

Step (2) Allocate a resource block to increase the diversity order of the slave i. Update $P_i \leftarrow D_i + 1$, and $D_i \leftarrow +1$, and $r \leftarrow -2$.

Step (3) If r>0, go to step (1), otherwise

Step (4) Slave i retransmits using $2D_i$ resource blocks, at diversity order $D_i$.

The probability of success for retransmission from slave i is $P_s(d_i, D_i)$. The time for the subsequent transmissions is $$T_{\geq 2}^{RDT} = T_{rx}(0) + T_{fb} + 2T_{ta} \qquad (3)$$

It is desired to improve the success rate over the DRT mode.

Hierarchical Relaying Transmission Mode

Figure 3:
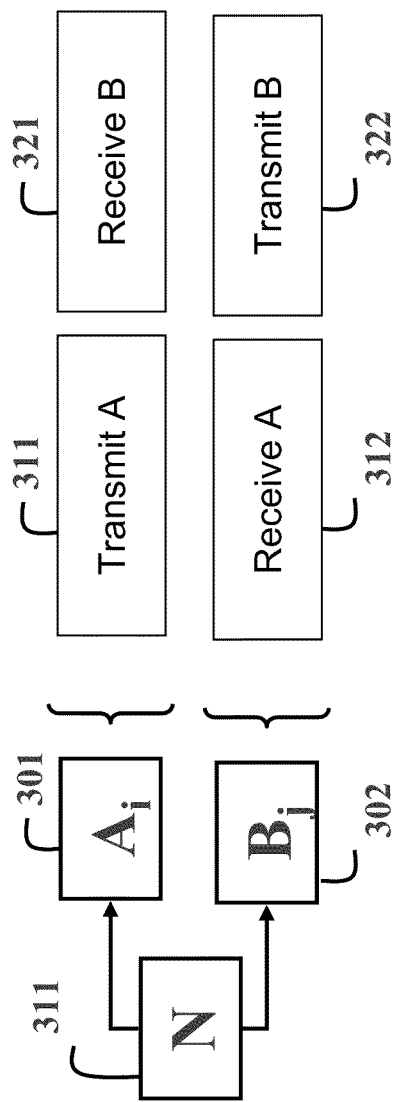
Figure 4:
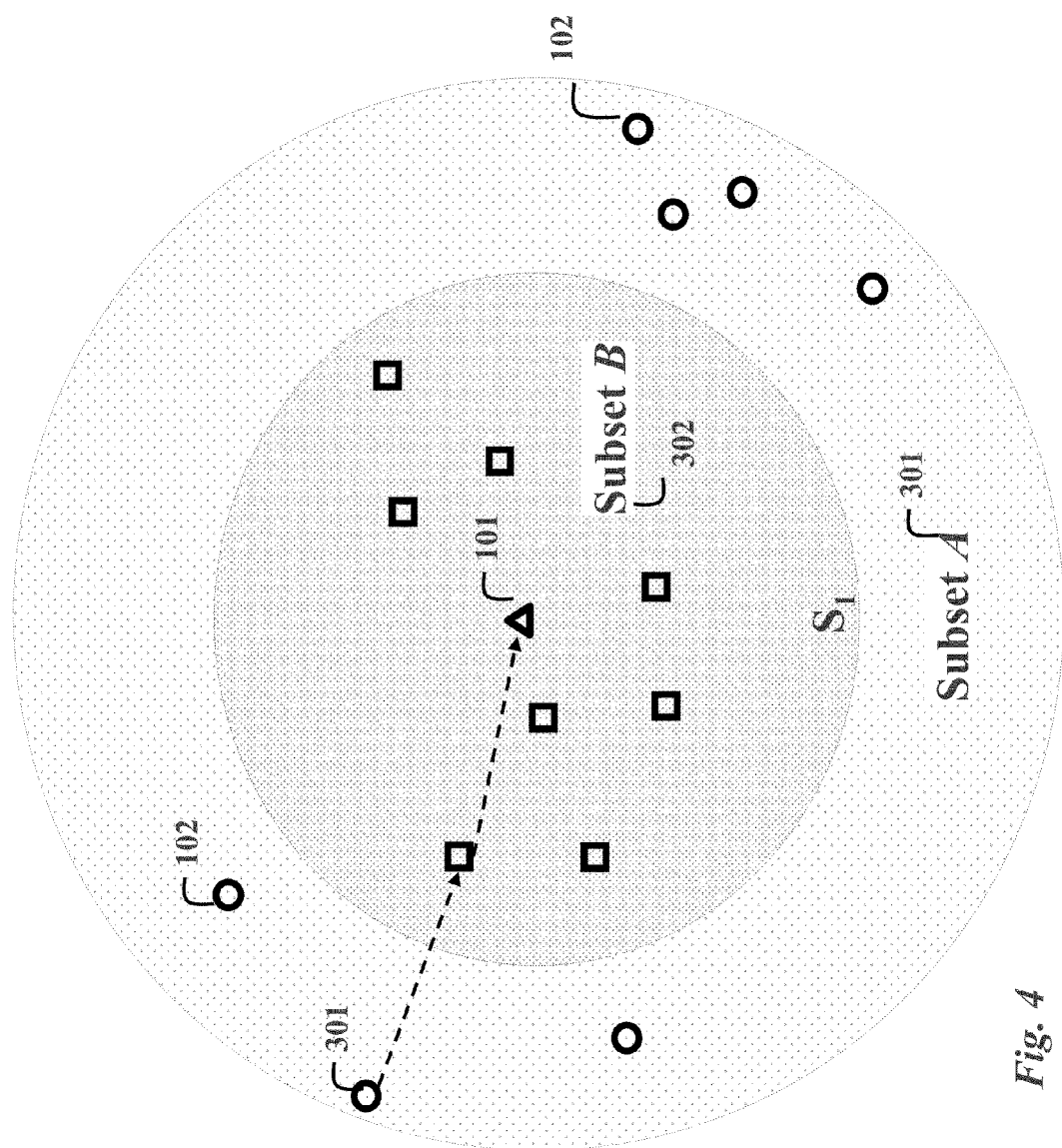

Rather than having all slave nodes to transmit concurrently during the first TxOP as for the DRT mode, the master can partition the set of N slaves 301 into multiple subsets, e.g., a first subset A(i) 301 and second subset B(j) 302, as shown in FIGS. 3-5. The first and second subsets are disjoint. The master distributes the slaves evenly over the subsets, and the slaves transmit sequentially by subset.

Only the slaves i from the first subset A transmit packets while the master and the slaves j from the subset B are in receive mode. Then, the slaves j only transmit packets while the master and slaves i in the first subset are in receive mode. In the following, the symbol "^" above the variables i and j indicates an estimate.

FIG. 4 shows another partitioning, where the network includes a line-of-sight barrier 400. Thus, the partitioning can be based on distance, or generally, on the probability of success.

The idea is that a slave j in subset B that successfully receives a packet from slave i in subset A can act as a relay node (relay). If the packet is not received by the master, and slave j has a large probability of success when transmitting to the master, then it makes sense to have slave j retransmit the packet during a later retransmission period, instead of slave i. This can occur when slave j is nearer to the master than slave i, or has a better channel to the master, generally a larger probability of success that the master will receive the packet.

Therefore, during the first transmission period, the slaves i in subset A transmits 311 while the slaves in subset B receive 312 the transmissions from the slaves in subset A. Then, the subset B transmits 321, while the subset A receives 322.

The slave i in subset A transmits a packet at diversity order a=M/N using 2a resource blocks in $T_{rx}(0)$ seconds. The master receives the packet successfully with probability $P_s(d, a)$, and slave j in subset B receives the packet successfully with probability $P_s(d_{ij}, a)$.

The slaves j explicitly indicate that the packets that were received successfully from slaves i, when the slaves j are transmitting to the master. The master uses this indication to schedule retransmissions, as described below.

The slave j in subset B transmits a packet at diversity order a=M/N using 2a resource blocks in $T_{rx}(N/2)$ seconds. The master receives the packet successfully with probability $P_s(d_j, a)$. The time for the HRT during the first CFP is $$T_1^{HRT} = T_{rx}(0) + T_{rx}(N/2) + T_{fb} + 3T_{ta} \qquad (4)$$

During subsequent retransmissions, resources are allocated so that each failed transmission has one direct or indirect (relay) retransmission to improve the transmissions for the slaves with the least probability of success.

HRT Resource Allocation

For subset A, slaves i with unsuccessful transmission to the master are in the set E of up to M/2 nodes. If K≤M/2, then the set E includes all nodes that have unsuccessful previous transmissions. If K>M=2, the master selects the nodes that have a largest probability of success. This is because the frame structure does not have sufficient resource for all slaves to retransmits, and another transmission opportunity is needed regardless. Hence, the method attempts to resolve as many transmissions as possible, so to leave more resources for the remaining nodes in the next transmission opportunity Slaves j in subset B that received the failed transmissions from slave i to the master are in set Y(i). For each slave in set E, the master selects the slave in set Y to retransmit according to $\arg\max_{j \in \{i\} \cup Y(i)} P_s(d_j, 1)$ using two resource blocks and diversity order of one.

As stated above, the remaining resource blocks are r=M−2K, and $$P_i = \begin{cases} 1, & \text{if } i \notin E, \\ P_s(d_{\hat{j}(i)}, 1), & \text{if } i \in E. \end{cases} \qquad (5)$$

The diversity order of the retransmission is $D_{ij} = I_{\{i \in E\}} I_{\{j = \hat{j}(i)\}}$.

Then, the following steps are performed.

Step (1) The slave with the least probability of success is $i=\arg\min_i:D_{ij}<Pi$.

If $ij<D_0$, then the master selects the slave with the smallest diversity order $$j=\arg\min_{i\in E}\min_j D_{ij}.$$

Step (2) The master select the slave j for retransmitting the packet from slave i as $$\hat{j}(i) = \arg\max_{j\in\{i\}\cup Y(i): D_{ij}<D_0} P_s(d_j, 1). \quad (6)$$

Step (3) The master allocates resource blocks according to $$D_{i\hat{j}(i)} \leftarrow D_{i\hat{j}(i)} + 1, \quad (7)$$

$$P_i \leftarrow 1 - \prod_j (1 - P_s(d_j), D_{ij}), \quad (8)$$

$$r \leftarrow r - 2. \quad (9)$$

Step (4) If r>0, go to step (1), otherwise

Step (5) Slave j retransmits the packet received form slave i using $2D_{ij}$ resource blocks with diversity order of $D_{ij}$.

The time for the transmissions is $$T_{\geq 2}^{RDT}=T_{tx}(0)+T_{fb}+2T_{ta}$$

Stochastic Relaying Transmission Mode

In stochastic relaying transmission (SRT) mode, slaves do not explicitly indicate successful reception as for HRT. Instead, the master determines a likelihood that a slave can act as a relay.

The time the first transmission is $$T_1^{SRT}=2T_{tx}(0)+T_{fb}+3T_{ta} \quad (10)$$

If slave j has received f packets from slave i that were not received by the master, then the conditional success probability of relaying with a transmission of diversity order D is $$q(i,j,f,D) = \begin{cases} P_s(d_i, D), & \text{if } j=i, \\ P_s(d_{ij}, a)P_s(d_j, D), & \text{if } j\in Y(i)\ \&\ f=0, \\ \dfrac{P_s(d_{ij}, a)(1-P_s(d_j, 1))^f P_s(d_j, D)}{1-P_s(d_{ij}, a)P_s(d_j, 1)^f}, & \text{if } j\in Y(i)\ \&\ f>0, \\ 0, & \text{oth.} \end{cases} \quad (11)$$

The number of times that slave j fails to relay a packet received from slave i is maintained in a variable $f_{ij}$, with all elements initialized to zero for each superframe. In the SRT mode, the set $Y(i)$ identifies all the slaves j that potentially have received packets from slave i. That is, $Y(i)=B$, and $Y(i)=A$.

Allocating Resources for Failed Transmission

For each slave $i\in E$, the master selects slave j according to $$\arg\max_{j\in\{i\}\cup Y(i)} q(i,j,f_{ij},1)$$

to relay the packet received from slave i using two resource blocks and diversity order of one.

The number of remaining resource blocks is r=M−2K, and $$P_i = \begin{cases} 1, & \text{if } i\notin E \\ q(i, \hat{j}(i), f_{i\hat{j}(i)}, 1), & \text{if } i\in E. \end{cases} \quad (12)$$

Also, we set $$D_{ij}=I_{\{i\in E\}}I_{\{j=\hat{j}(i)\}}.$$

Then, the following steps are performed.

Step (1) The master determines the slave with the smallest probability of success according to $$\hat{i}=\arg\min_{i:D_{ij}<D_0}\forall_j P_i.$$

If $D_{ij}<D_0$, then the master determines the slave j with the smallest diversity order according to $$\hat{j}=\arg\min_{i\in E}\min_j D_{ij}.$$

Step (2) The master determines the slave j for retransmitting the packet received from slave i according to $$\hat{j}(i) = \arg\max_{j\in\{i\}\cup Y(i): D_{ij}<D_0} q(\hat{i}, j, f_{ij}+d_{ij}, 1). \quad (13)$$

Step (3) The master allocates resource blocks according to $$D_{i\hat{j}(i)} \leftarrow D_{i\hat{j}(i)} + 1, \quad (14)$$

$$P_i \leftarrow 1 - \prod_j (1 - q(\hat{i}, j, f_{ij}, D_{ij})), \quad (15)$$

$$f_{ij} \leftarrow f_{ij} + \min\{D_{ij}, D_0\}, \quad (16)$$

$$r \leftarrow r - 2. \quad (17)$$

Step (4) If r>0, go to step (1), otherwise:

Step (5) Slave j retransmits the packets received from slave i using $2D_{ij}$ resource blocks with diversity order of $D_{ij}$.

In the SRT mode, after each subsequent transmission, the set $Y(i)$ can be updated because the non-transmitting slaves can receive the packets from the transmitting slaves. The time for each of the subsequent transmissions takes is $$T_{\geq 2}^{SRT}=T_{tx}(0)+T_{fb}+2T_{ta} \quad (18)$$

Network Partitioning

HRT Node Partitioning

The number of times that slave j fails to retransmit for slave i is $f_{ij}$. The master maintains the probability $P_s(d_i, 1)$ for all slaves. Because only the slaves in subset B can retransmitting packets received from slave i in subset A, the performance can only be improved when the slaves j in set B have a larger probability of success than the slaves i in subset A. Hence, the master assigns slaves with the smallest probabilities of success to the subset A, and other slaves, with larger probabilities of success, to the subset B.

SRT Node Partitioning

The master maintains the probabilities $P_s(d_i, 1)$ and $Ps(d_{ij}, 1)$. The master considers the probabilities of success for direct and indirect transmissions to determine the partitioning. The master determines the slave i with the smallest cumulative probability of success. It is assumed that each slave j can act as a relay for one slave i, and each slave node i can have two slaves j as relays.

When the slave i and all relay slaves j transmit the packet one time at diversity order one, the probability of success is maintained in z(i). When a retransmission either by slave i or relay slave j, the probability of success is maintained v(i).

The slaves i that are associated with relay slaves j are in set S. The slave nodes that are not associated with relays are in set R.

Step (1) The master initializes $z(i)=v(i)=P_s(d_i, 1)$, sets S and R, and a directed edge set U. The master partitions the slaves according to the set U.

Step (2) The master determines the slave with the smallest probability of success according to i=arg $\min_{i \in S}$ z(i), and goes to step (7) if the set S is empty.

Step (3) The master determines the slave with the largest probability of success according to j=arg $\max_{j \in R}$ q(i,j,0,1), where the function max returns the maximum value.

Step (4) If using the relay slave does not improve the probability of success for retransmission, i.e., q(i,j,0,1)≤v(i), the slave i does not need to be associated with additional relay slaves. Therefore, remove slave i from the set S, and go to step (2).

Step (5) Add a directed edge (i,j) to the set U. Remove slave j from the set R. If the set U has two edges that originate from slave i, then remove slave i from the set S.

Step (6) Update z(i) and v(i) as $$z(\hat{i}) \leftarrow z(\hat{i})+(1-z(\hat{i}))q(\hat{i},\hat{j},0,1) \quad (19)$$

$$v(\hat{i}) \leftarrow \max\{q(\hat{i},\hat{j},1,1), P_s(d_{\hat{i}},1)\} \quad (20)$$

and go to step (2).

Step (7) The master assign slaves to subsets according to directed edge set U.

The directed edge set U forms tree structures and cycles. For the tree structures, slaves in adjacent levels of the tree are assigned to alternating subsets. If cycles have an even number of nodes, the nodes can be assigned to alternating subsets. If the number of nodes is odd, then the edge is deleted and the cycle becomes a tree.

Effect of the Invention

The embodiments of the invention provide hierarchical and stochastic relaying transmission modes that exploit path diversity to improve reliability in time constrained OFDMA star network including a master node and a set of slave nodes.

The slave nodes are partitioned into two sets. While the first subset transmits, the master and the second subset operate in receive mode. This way, failed transmissions by slaves in the first subset can be retransmitted by the slaves in the second subset, acting as relay nodes.

The HRT and SRT modes have significantly better performance than the conventional repeated direct transmission mode as defined according to the IEEE 802.15.4e standard. Packet loss rate is about two orders of magnitude smaller.

The HRT mode has the best overall performance with some additional signaling overhead. The SRT requires additional transmit/receive turnaround time during the superframe.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for communicating packets in a wireless star network, including a master node (master) and a set of N slave nodes (slaves), wherein the network uses orthogonal frequency division multiple access (OFDMA), comprising:
   partitioning, by the master, the set of slaves in a first subset A(i) and second subset B(j), wherein the first and second subsets are disjoint;
   transmitting packets by the first subset of slaves only while the master and second subset of slaves operate in receive mode; and
   transmitting packets by the second subset of slaves only while the master and first of slaves operate in receive mode.

2. The method of claim 1, further comprising:
   distributing the N slaves evenly over the first and second subsets.

3. The method of claim 1, wherein each packet includes L bits of data and Q bits of optional protocol specific overhead, wherein a bit rate is R bits per second and a channel path loss exponent is α, and wherein a packet success rate for transmitting the L+Q bits using a single resource block is $\exp(-cd^\alpha)$, wherein c is a constant, and d is a distance between the slave and the master, wherein a transmission time is (L+Q)/R, wherein a channel between the master and the slave allows a maximum of $D_0$ independent resource blocks, and the slave transmits the L+Q bits using r≥2 resource blocks in $2T_{tx}(Q)$ seconds, and an increased diversity order improves a probability of success to $$P_s(d,r)=1-(1-\exp(-cd^\alpha))^{\min(r,D_0)},$$

where a function exp is an exponential, and a function min returns a minimum value.

4. The method of claim 3, wherein a distance between the slave i and the master is $d_i$, and a distance between the slave i and the slave j is $d_{ij}$, and a probability of success for transmitting the packet from slave node i to the master using a single resource block is $P_s(d_i, 1)$, and the probability of success for the slave j to receive the packet is $P_s(d_{ij}, 1)$.

5. The method of claim 1, further comprising:
   assigning, by the master, the slaves to the second subset based on probabilities of success of receiving the packets from the first subset of slaves.

6. The method of claim 1, wherein the partitioning is according to distances between the master and the set of slaves.

7. The method of claim 1, wherein the second subset of slaves transmit the packets received successfully from the first subset of slaves if the master unsuccessfully receives the packets from the first subset of slaves.

8. The method of claim 7, the second subset of slaves explicitly indicate to the master when the packets are received successfully from the first subset of slaves.

9. The method of claim 5, further comprising:
   selecting, by the master, the slave from the second subset of slaves with a largest probability of success to transmit the packets received successfully from the first subset of slaves if the master unsuccessfully receives the packets from the first subset of slaves.

* * * * *